Dec. 4, 1956  W. E. ARNOLDI  2,772,621
AIRCRAFT AIR CONDITIONING SYSTEM
Filed Nov. 16, 1953
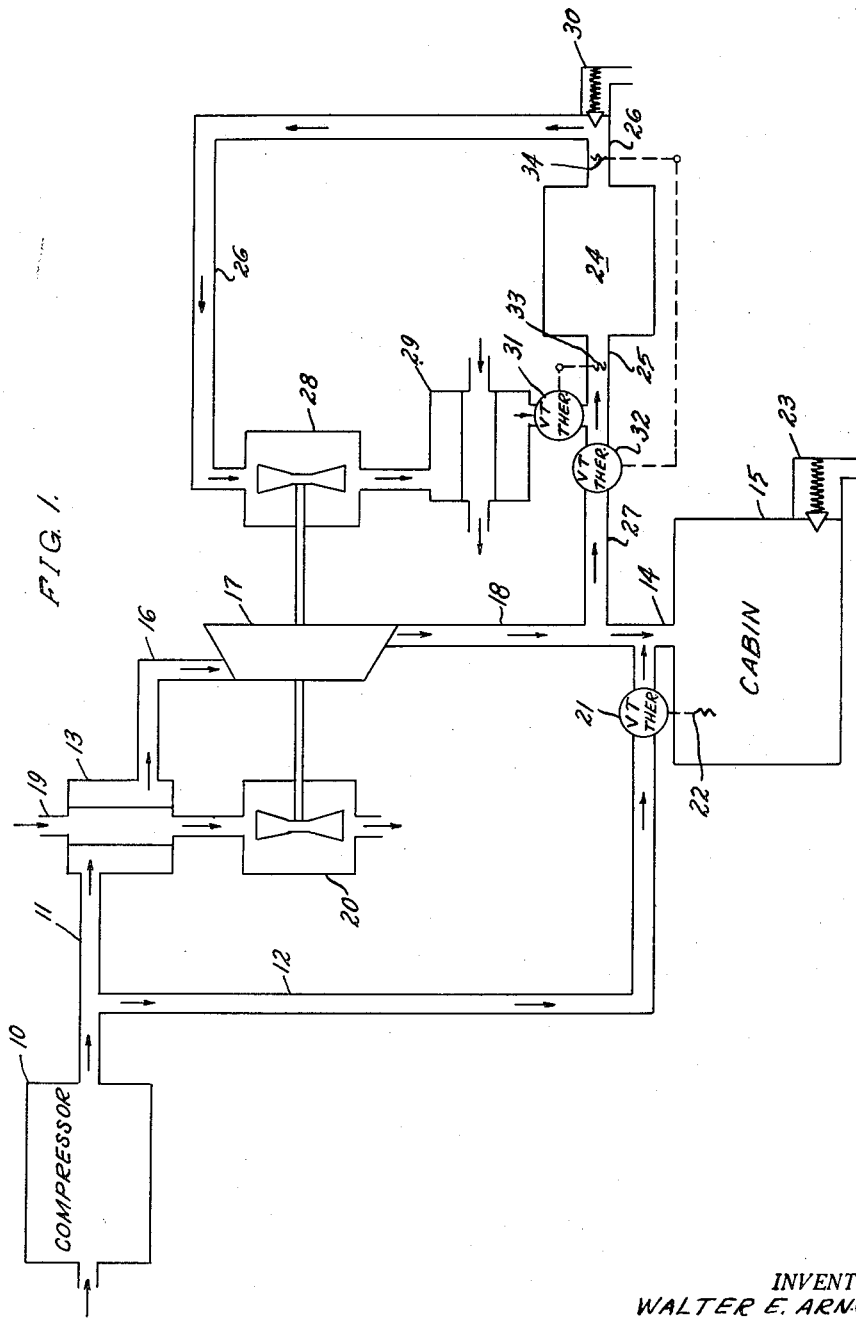
INVENTOR.
WALTER E. ARNOLDI
BY
ATTORNEY

United States Patent Office 2,772,621
Patented Dec. 4, 1956

2,772,621

AIRCRAFT AIR CONDITIONING SYSTEM

Walter E. Arnoldi, West Hartford, Conn., assignor to United Aircraft Corporation, East Hartford, Conn., a corporation of Delaware Application November 16, 1953, Serial No. 392,104

13 Claims. (Cl. 98—1.5)

This invention relates to improvements in an aircraft air conditioning system.

It is the general object of the invention to provide a system which is adapted to supply air at a selected temperature to the cabin and main compartments of an aircraft and which is also adapted to provide air to another compartment of the aircraft wherein the air temperature requirements are more restrictive and may differ considerably from the selected air temperature of the cabin.

Other objects and advantages of the invention will become apparent to those skilled in the art from the following detailed description with reference to the accompanying drawing which, by way of preferred example only, illustrates one specific system incorporating the features of the present invention and in which Fig. 1 is a schematic view of the system and the components thereof.

The design of an air conditioning system for the present day aircraft entails the consideration of several factors which vary with changes in flight operation and which dictate the requirements of the system. For example, during ground operation and low level flight, the system may be required to deliver a cooling air stream to the aircraft cabin to provide comfortable conditions for the occupants thereof. At moderate altitudes the system may be required to deliver a warm stream. During high altitude-high speed operation the system will probably be called upon for a cold air supply.

In the past, various systems have been developed to utilize a compressed air source and to supply air at the various temperatures required for cabin comfort. In such systems some of the hot, compressed air is cooled by conventional means to provide a cold air cabin supply and some of the hot, compressed air is utilized to provide a hot air supply. The hot and cold air supplies are mixed in varying proportions to obtain the desired cabin air temperature under all operating conditions.

The systems may also be adapted in accordance with conventional practice to maintain a selected cabin pressure. Since the present invention relates primarily to improvements in air temperature control apparatus, pressure control considerations will be only briefly referred to.

The present invention may be briefly described as embracing improvements in an air conditioning system which includes a cold air cabin supply. More specifically, the improvements encompass the use of the cold air cabin supply as the source of air for temperature control within an isolated compartment or compartments wherein the temperature must be maintained within restrictive limits differing from the cabin temperature limits and falling within a range well above the temperature of the cold air supply.

With detailed reference to the drawing, the numeral 10 designates an engine air compressor, or any other conventional means, which may be used as a source of primary compressed air for the system. There are two outlet conduits 11 and 12 extending from the compressor 10 and delivering hot compressed air to a heat exchanger 13 and to the cabin air inlet conduit 14, respectively. The air which is discharged from the compressor 10 through the conduit 11 is cooled to provide the previously mentioned cold air supply for the cabin 15 and the compressed air which is discharged through the conduit 12 provides the hot air supply for the cabin.

With specific reference to the cold air supply, it will be noted that the air in the conduit 11 is passed through the heat exchanger 13 to give up most of its heat and is then passed through a conduit 16 to drive a turbine 17 wherein the air is expanded and in doing work loses additional heat before being passed into a cold air supply line or conduit 18 which connects with the cabin air inlet conduit 14. The cooling air for the heat exchanger 13 is introduced therein through a conduit 19 which may be supplied with ram air and/or the cooling air may be drawn into the heat exchanger by a fan or compressor 20 which may be conveniently driven by the turbine 17.

As shown in the drawing, the hot air supply from the conduit 12 and the cold air supply from the conduit 18 are mixed in the cabin air inlet conduit 14 before introduction to the cabin. The proportion of the mixture is controlled by means of a throttle valve 21 located in the hot air supply conduit 12. It is preferred that the throttle valve 21 be manually operable and also be automatically operable by thermosensitive means responsive to cabin temperature. Such thermosensitive control means is schematically illustrated at 22.

So much of the air conditioning system as has been described is conventional and constitutes a complete system for air conditioning the cabin 15. The system has been described without consideration of the pressure requirements for various altitudes and varying conditions of flight operation. For purposes of simplicity, it may be assumed that the system will deliver air to the cabin under pressure sufficient for all contemplated flight conditions and a pressure responsive cabin vent or relief valve 23 is arranged to maintain cabin pressure at a desired or selected level.

The aforedescribed cabin supply system may be more fully understood if arbitrary figures of temperature and pressure are used in the explanation of the operation. If the compressor delivers air at 700° F. and at 60 p. s. i., it will be quite apparent that the hot air cabin supply in the line 12 will be at or near 700° F., 60 p. s. i. In passing from the conduit 11 to the conduit 16 through the heat exchanger 13, the temperature of the hot compressed air may be reduced to 200° F. and the pressure reduced to 55 p. s. i. In passing from the conduit 16 to the cold air supply conduit 18 through the turbine 17, the temperature of the air may be reduced from 200° F. to 0° F. and the pressure reduced to 10 p. s. i. Based upon these arbitrary figures of temperature and pressure, it will be seen that the air cabin supply is at 0° F. and 10 p. s. i., while the hot air cabin supply is at 700°F. and 60 p. s. i.

If it is desired to maintain an air temperature of approximately 65° F. within the cabin 15 and assuming that the outside air temperature is 95° F., it will be quite apparent that there will be little or no need for air flow from the hot air supply line 12 into the cabin air inlet conduit 14. Accordingly, the hot air supply throttle valve 21 may be closed or substantially closed by the thermo-sensitive control means 22. However, if flight conditions change so that the outside air temperature drops to 0° F., it will be quite apparent that the throttle valve 21 must be opened to introduce a greater amount of hot air to the cabin inlet conduit 14 in order to maintain the selected 65° F. temperature within the cabin. In systems of this type the hot air supply may be completely closed during some anticipated conditions of flight and such conditions will dictate the need for cold air supply at temperatures of a low order. For example, it may be necessary to maintain a cold air supply at a temperature falling within the range of from 0° F. to 30° F.

The 65° F. air temperature selected for cabin comfort may be entirely unsatisfactory for another compartment or compartments. An isolated compartment in the aircraft may contain equipment which operates satisfactorily only if air-cooled to maintain the temperature of the equipment within a relatively restricted range. For example, the cooling requirements of the equipment may dictate that air be introduced to the compartment at no less than 70° F. and discharged from the compartment at no more than 140° F.

Obviously, there is much to be gained in adapting the cabin air conditioning system to furnish the restrictive cooling needs of the isolated compartment. A rather obvious technique for adapting the cabin system would involve mixing the hot and cold cabin air supplies in the inlet to the isolated compartment. However, this would impose a large increase on the demand for compressed air for the system and the work expended in compressing the air would be lost except for the benefit gained in providing for increased temperature.

In accordance with the present invention, the isolated compartment, indicated by reference numeral 24, is provided with an air inlet duct 25 and a discharge duct 26 and the warm air from the said discharge duct is directed into the said inlet duct for re-circulation through the compartment 24. A conduit 27 is also provided to interconnect the cold air cabin supply line 18 and the inlet duct 25 to provide a mixture of cold air and warm-re-circulated air in the said inlet duct. A fan or compressor 28 having an inlet in communication with the outlet duct is utilized to compensate pressure loss in the compartment 24 and thus to re-circulate the warm air. The re-circulating fan 28 may be driven by the turbine 17, but, of course, other conventional drive means may be utilized.

It will be readily understood that the supply of mixed warm and cold air for the compartment 24 can be supplied, in accordance with the present invention, while minimizing the drain of compressed air from the cabin supply system.

It may be desirable to utilize a heat exchanger 29 in the re-circulating line 26 between the fan 28 and the inlet duct 25. The need for a heat exchanger in the re-circulating line depends upon the temperature increase of the warm air passing through the fan and the temperature increase is in turn dependent upon the pressure drop in the compartment 24. More specifically, if the said pressure drop is relatively large, the fan 28 will be called upon to compensate the drop and will bring about a relatively large temperature increase in the re-circulated warm air. For example, if the 70° F. air mixture in the inlet duct 25 is to be introduced to the compartment 24 at 10 p. s. i. (the exemplary pressure of the cold air cabin supply) and if the pressure of the 140° F. warm air in the compartment discharge duct 26 is 8 p. s. i., the re-circulating fan 28 may, in increasing the re-circulating air pressure to 10 p. s. i., bring about an excessive increase in air temperature. In such event, the heat exchanger 29 may be utilized to cool the re-circulated air to a level more in keeping for the mixture. A pressure drop will occur within the heat exchanger and so the fan should be adapted to increase the pressure above the 10 p. s. i. level. For example, the fan 28 may be adapted to increase the temperature and pressure of 140° F., 8 p. s. i. air to 220° F., 11 p. s. i. and the heat exchanger 29 adapted to discharge said air at 120° F., 10 p. s. i. The upper limit of air pressure to the fan may be controlled by incorporating a pressure responsive relief valve 30 in the line 26 adjacent the compartment 24.

In order to maintain the proper air temperature within the compartment 24 to fulfill the restrictive cooling requirements, the temperature of the mixed air in the inlet duct must be controlled within critical limitations. Such control will also determine the temperature at the compartment discharge duct. In further accord with my invention, I control mass flow of re-circulated warm air into the inlet duct in response to the temperature of the mixture in the said inlet duct. I control mass flow of cold air to the inlet duct in response to the temperature of the air in the compartment discharge duct.

Such temperature responsive control may be accomplished as shown by a thermo-sensitive throttle valve 31 disposed in the re-circulating conduit adjacent the inlet duct and by a thermosensitive throttle valve 32 disposed in the cold air conduit 27 adjacent the inlet duct 25. The position of throttle valve 31 is controlled by a conventional thermo-sensing element 33 disposed in the inlet duct 25 and responsive to the temperature therein. The position of throttle valve 32 is controlled by a similar thermo-sensing element 34 disposed in the discharge duct 26, adjacent the compartment 24, and responsive to the temperature therein.

If the sensing element 33 is preset to regulate inlet duct temperature to the exemplary 70° F., and the temperature therein falls below such level, throttle valve 31 will be opened to admit more warm air to the mixture. If the inlet temperature exceeds 70° F., throttle valve 31 will be moved toward closed position to admit less warm air to the mixture. If the sensing element 34 is preset to regulate discharge duct temperature to the exemplary 140° F., and if the temperature therein falls below such level, throttle valve 32 will be moved toward closed position to reduce the cold air flow to the mixture. If the discharge temperature exceeds 140° F., throttle valve 32 will be opened to admit more cold air to the mixture. Accordingly, the throttle valves 31 and 32 may always be fluctuating in exercising flow control of the warm and cold air to the mixture and is thereby exercising critical control of the temperature of the mixture.

While the foregoing re-circulating system for controlling temperature in an isolated compartment has been described in combination with one specific cabin air conditioning system, it should be understood that the re-circulating system can be incorporated in any other cabin air conditioning system which includes a cold air supply at a temperature lower than desirable for introduction to the isolated compartment or compartments. Accordingly, the invention should not be construed as limited to the specific disclosure otherwise than indicated by the claims which follow.

I claim as my invention:

1. In combination with an aircraft air conditioning system of the type adapted to maintain cabin air at a selected temperature and including an air supply for the cabin, means to adapt the system to maintain air at another temperature in an isolated compartment which has an inlet and an outlet, said means including a first conduit interconnecting said air supply and said inlet, a second conduit interconnecting said outlet and said inlet, means in said second conduit for compensating the pressure drop in said compartment and for circulating air from said outlet to said inlet, and thermo-responsive flow control means in said first conduit adjacent said inlet and including a thermo-sensitive element disposed in said outlet.

2. In combination with an aircraft air conditioning system of the type adapted to maintain cabin air at a selected temperature and including an air supply for the cabin, means to adapt the system to maintain air at another temperature in an isolated compartment which has an inlet and an outlet, said means including a first conduit interconnecting said air supply and said inlet, a second conduit interconnectig said outlet and said inlet, an air compressor disposed in said second conduit for compensating the pressure drop in said compartment and for circulating air from said outlet to said inlet, and thermo-responsive flow control means in said first conduit adjacent said inlet and including a thermo-sensitive element disposed in said outlet.

3. In combination with an aircraft air conditioning system of the type adapted to maintain cabin air at a selected temperature and including a cold air supply for the cabin, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, means in said second conduit for compensating the pressure drop in said compartment and for circulating air from said outlet to said inlet, and thermo-responsive flow control means in one of said conduits responsive to the temperature of air in said inlet.

4. In combination with an aircraft air conditioning system of the type adapted to maintain cabin air at a selected temperature and including a cold air supply for the cabin, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, means in said second conduit for compensating the pressure drop in said compartment and for circulating air from said outlet to said inlet, and thermo-responsive flow control means in said second circuit adjacent said inlet including a thermo-sensing element disposed in said inlet.

5. In combination with an aircraft air conditioning system of the type adapted to maintain cabin air at a selected temperature and including a cold air supply for the cabin, means to adapt the system to maintain air at another temperature above the temperature of the cold air supply in an isolated compartment which has an inlet and an outlet, said means including a first conduit interconnecting said cold air supply and said inlet, a second conduit interconnecting said outlet and said inlet, means in said second conduit for compensating the pressure drop in said compartment and for circulating air from said outlet to said inlet, and thermo-responsive flow control means in said first conduit adjacent said inlet and including a thermo-sensing element in said outlet.

6. In combination with an aircraft air conditioning system of the type adapted to maintain cabin air at a selected temperature and including a cold air supply for the cabin, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, an air compressor in said second conduit for compensating the pressure drop in said compartment and for circulating air from said outlet to said inlet, thermo-responsive flow control means in said first conduit and including a thermo-sensing element in said outlet, and thermo-responsive flow control means in said second conduit adjacent said inlet and including a thermo-sensing element in said inlet.

7. In combination with an aircraft air conditioning system of the type adapted to maintain cabin air at a selected temperature and including a cold air supply for the cabin, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, an air compressor disposed in said second conduit for compensating the pressure drop in said compartment and for circulating air from said outlet to said inlet, a heat exchanger disposed in said second conduit between said air compressor and said inlet, and thermo-responsive flow control means in one of said conduits responsive to the temperature of air in said inlet.

8. In combination with an aircraft air conditioning system of the type adapted to maintain cabin air at a selected temperature and including a cold air supply for the cabin, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, an air compressor disposed in said second conduit for compensating the pressure drop in said compartment and for circulating air from said outlet to said inlet, a heat exchanger disposed in said second conduit between said air compressor and said inlet, and a thermo-responsive flow control valve in said second conduit adjacent said inlet and including a thermo-sensing element disposed in said inlet.

9. In combination with an aircraft air conditioning system of the type adapted to maintain cabin air at a selected temperature and including a cold air supply for the cabin, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, an air compressor disposed in said second conduit for compensating the pressure drop in said compartment and for circulating air from said outlet to said inlet, a heat exchanger disposed in said second conduit between said air compressor and said inlet, and a thermo-responsive flow control valve in said first conduit including a thermo-sensing element disposed in said outlet.

10. In combination with an aircraft air conditioning system of the type adapted to maintain cabin air at a selected temperature and including a cold air supply for the cabin, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, an air compressor disposed in said second conduit for compensating the pressure drop in said compartment and for circulating air from said outlet to said inlet, a heat exchanger disposed in said second conduit between said air compressor and said inlet, a thermo-responsive flow control valve in said first conduit including a thermo-sensing element disposed in said outlet, and a thermo-responsive flow control valve in said second conduit adjacent said inlet including a thermo-sensing element disposed in said inlet.

11. The combination in an aircraft air conditioning system comprising a source of hot compressed air, one compressed air conduit extending from said source to the cabin of the aircraft, another compressed air conduit extending from said source to the cabin, means in said one conduit for reducing the temperature of air therein to provide a cold air supply for the cabin, means for mixing air from said one conduit with air from said other conduit to maintain cabin air at a selected temperature, means to adapt the system to maintain air at another temperature in an isolated compartment which has an inlet and an outlet, said means including a first conduit interconnecting said cold air supply and said inlet, a second conduit interconnecting said outlet and said inlet, means in said second conduit for compensating the pressure drop in said compartment and for circulating air from said outlet to said inlet, and flow control means in one of said first and second conduits responsive to the temperature of air in said inlet.

12. The combination in an aircraft air conditioning system comprising a source of hot compressed air, one compressed air conduit extending from said source to the cabin of the aircraft, another compressed air conduit extending from said source to the cabin, means in said one conduit for reducing the temperature of air therein to provide a cold air supply for the cabin, means for mixing air from said one conduit with air from said other conduit to maintain cabin air at a selected temperature, means to adapt the system to maintain air at another temperature in an isolated compartment which has an inlet and an outlet, said means including a first conduit interconnecting said cold air supply and said inlet, a second conduit interconnecting said outlet and said inlet, an air compressor disposed in said second conduit for compensating the pressure drop in said compartment and for circulating air from said outlet to said inlet, a thermo-responsive flow control valve in said first conduit including a thermo-sensing element disposed in said outlet, and a thermo-responsive flow control valve in said second conduit adjacent said inlet including a thermo-sensing element disposed in said inlet.

13. The combination in an aircraft air conditioning system comprising a source of hot compressed air, one compressed air conduit extending from said source to the cabin of the aircraft, another compressed air conduit extending from said source to the cabin, means in said one conduit for reducing the temperature of air therein to provide a cold air supply for the cabin, means for mixing air from said one conduit with air from said other conduit to maintain cabin air at a selected temperature, means to adapt the system to maintain air at another temperature above the temperature of said cold air supply in an isolated compartment which has an inlet and an outlet, said means including a first conduit interconnecting said cold air supply and said inlet, a second conduit interconnecting said outlet and said inlet, an air compressor disposed in said second conduit for compensating the pressure drop in said compartment and for circulating air from said outlet to said inlet, a heat exchanger disposed in said second conduit between said air compressor and said inlet, a thermo-responsive flow control valve disposed in said first conduit including a thermo-sensing element disposed in said outlet, and a thermo-responsive flow control valve disposed in said second conduit adjacent said inlet and including a thermo-sensing element disposed in said inlet.

References Cited in the file of this patent

UNITED STATES PATENTS

| | | |
|---|---|---|
| 2,439,793 | Braddon | Apr. 20, 1948 |
| 2,451,280 | Del Mar | Oct. 12, 1948 |
| 2,561,633 | Palmatier | July 24, 1951 |